(12) United States Patent
Mindeman et al.

(10) Patent No.: US 7,725,294 B2
(45) Date of Patent: May 25, 2010

(54) POWER MACHINE DIAGNOSTIC SYSTEM AND METHOD

(75) Inventors: Spencer L. Mindeman, West Fargo, ND (US); Scott R. Rossow, Kindred, ND (US); Jason L. Magnuson, Fargo, ND (US); Dean A. Kirsch, Lisbon, ND (US); Trevor W. Krause, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 157 days.

(21) Appl. No.: 11/949,955

(22) Filed: Dec. 4, 2007

(65) Prior Publication Data

US 2009/0144027 A1   Jun. 4, 2009

(51) Int. Cl.
*G06F 11/30* (2006.01)
*G06F 15/00* (2006.01)

(52) U.S. Cl. .......................... 702/183; 701/29

(58) Field of Classification Search ................ 702/182, 702/183; 701/29, 30; 700/26, 177; 318/490
See application file for complete search history.

(56) References Cited

U.S. PATENT DOCUMENTS

| | | | |
|---|---|---|---|
| 4,831,560 A | 5/1989 | Zaleski | |
| 5,737,215 A | 4/1998 | Schricker et al. | |
| 5,889,671 A | 3/1999 | Autermann et al. | |
| 5,924,371 A | 7/1999 | Flamme et al. | |
| 6,236,917 B1 | 5/2001 | Liebl et al. | |
| 6,351,722 B1 | 2/2002 | Struck et al. | |
| 6,449,884 B1 | 9/2002 | Watanabe et al. | |
| 6,493,616 B1 | 12/2002 | Rossow et al. | |
| 6,662,881 B2 | 12/2003 | Domann | |
| 6,728,619 B2 | 4/2004 | Adachi et al. | |
| 6,785,596 B2 * | 8/2004 | Brandt et al. .................. 701/50 |
| 6,907,384 B2 | 6/2005 | Adachi et al. | |
| 6,941,208 B2 | 9/2005 | Mahoney et al. | |
| 6,954,689 B2 | 10/2005 | Hanson et al. | |
| 7,034,710 B2 | 4/2006 | Falada et al. | |
| 7,099,722 B2 | 8/2006 | Casey | |
| 7,124,058 B2 | 10/2006 | Namaky et al. | |
| 7,222,051 B2 | 5/2007 | Shibata et al. | |
| 7,248,954 B2 | 7/2007 | Chinnadurai et al. | |
| 2007/0069678 A1 * | 3/2007 | Lindsey ...................... 318/490 |
| 2007/0073460 A1 | 3/2007 | Bertosa et al. | |
| 2007/0100520 A1 | 5/2007 | Shah et al. | |
| 2007/0213895 A1 | 9/2007 | Nakayama | |

* cited by examiner

*Primary Examiner*—Bryan Bui
(74) *Attorney, Agent, or Firm*—John D. Veldhuis-Kroeze; Westman, Champlin & Kelly, P.A.

(57) ABSTRACT

A power machine diagnostic system. The diagnostic tool system includes a first interface removably coupled to a power machine, a computer to identify a type of the power machine coupled at the first interface, and a second interface between the tool and the computer.

24 Claims, 8 Drawing Sheets

POWER MACHINE DIAGNOSTIC SYSTEM AND METHOD

BACKGROUND

Embodiments of the invention relate to a portable universal diagnostic system for power machines.

Various types of power machines typically have same or similar interfaces. Different tools are used to perform various functions such as diagnoses and control on each type of machine. As a result, technicians working on different machines are required to learn how to operate each tool. Different tools generally require different production lines, which can be costly. Learning to operate different tools is also time-consuming and cost-ineffective.

SUMMARY

In one embodiment, the invention provides a machine diagnostic system that includes a power machine, a portable diagnostic tool, and an external computing device. The power machine includes a machine connector, a data storage to store machine information, and a machine controller that is coupled to the machine connector and the data storage. The machine controller also operates the power machine, transmits the machine information from the data storage, and receives data through the connector. The portable diagnostic tool can be coupled to the power machine. Particularly, the tool includes a first connector to be removably coupled to the machine connector, a processor to receive the machine information through the first connector, and to send at least a portion of the machine information, a second connector configured to relay the at least a portion of the machine information, and to receive data to be processor by the processor, and a removable computer-readable medium configured to record at least a portion of the machine information. The external computing device can be coupled to the portable diagnostic tool at the second connector, receives the at least a portion of the machine information, identifies a type of machine coupled to the first interface based on the received machine information, and instructs the processor to record at least a portion of the machine information.

In another embodiment, the invention provides a method of diagnosing various, distinct power machines with a portable diagnostic tool. The power machine has an machine interface that communicates with a controller of the machine. The method includes removably coupling a first interface of the tool to the machine interface of the power machine, and communicating data from the controller of the machine to the first interface through machine interface. The method also includes receiving the data at a processing module of the tool through the first interface, identifying a type of machines coupled to the first interface based on the received data at the processing module, and receiving from the processing module through the second interface control instructions based on the identified machine. The method further includes communicating at least a portion of the control instructions from the processing module to the controller of the power machine through the respective first interface and machine interface, and recording data indicative of the machine in response to the control instructions.

In another embodiment, the invention provides a portable diagnostic tool configured to be removably connected to a power machine having a machine controller configured to store machine information and to operate the machine, and a machine connector, and configured to be removably connected to a computer. The tool includes a first interface connector, a tool controller, a second interface connector, and a removable computer-readable medium. The first interface connector is removably connected to the machine connector. The tool controller communicates with the machine controller through the first interface connector, retrieves the machine information, and communicates the machine information to the computer. The second interface connector configured to be removably connected to the computer, to relay data including the machine information to the computer, and to relay instructions including data relating to the machine information from the computer to the tool controller and the machine controller. The removable computer-readable medium records or logs operating parameters of the machine in response to the received instructions at the machine controller from the computer.

With the embodiments of the inventions, technicians can connect a single diagnostic tool to different types of attachments. Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" and "controller" may include or refer to both hardware and/or software. Furthermore, throughout the specification capitalized terms are used. Such terms are used to conform to common practices and to help correlate the description with the coding examples and drawings. However, no specific meaning is implied or should be inferred simply due to the use of capitalization. Thus, the claims should not be limited to the specific examples or terminology or to any specific hardware or software implementation or combination of software or hardware.

Figure 1:
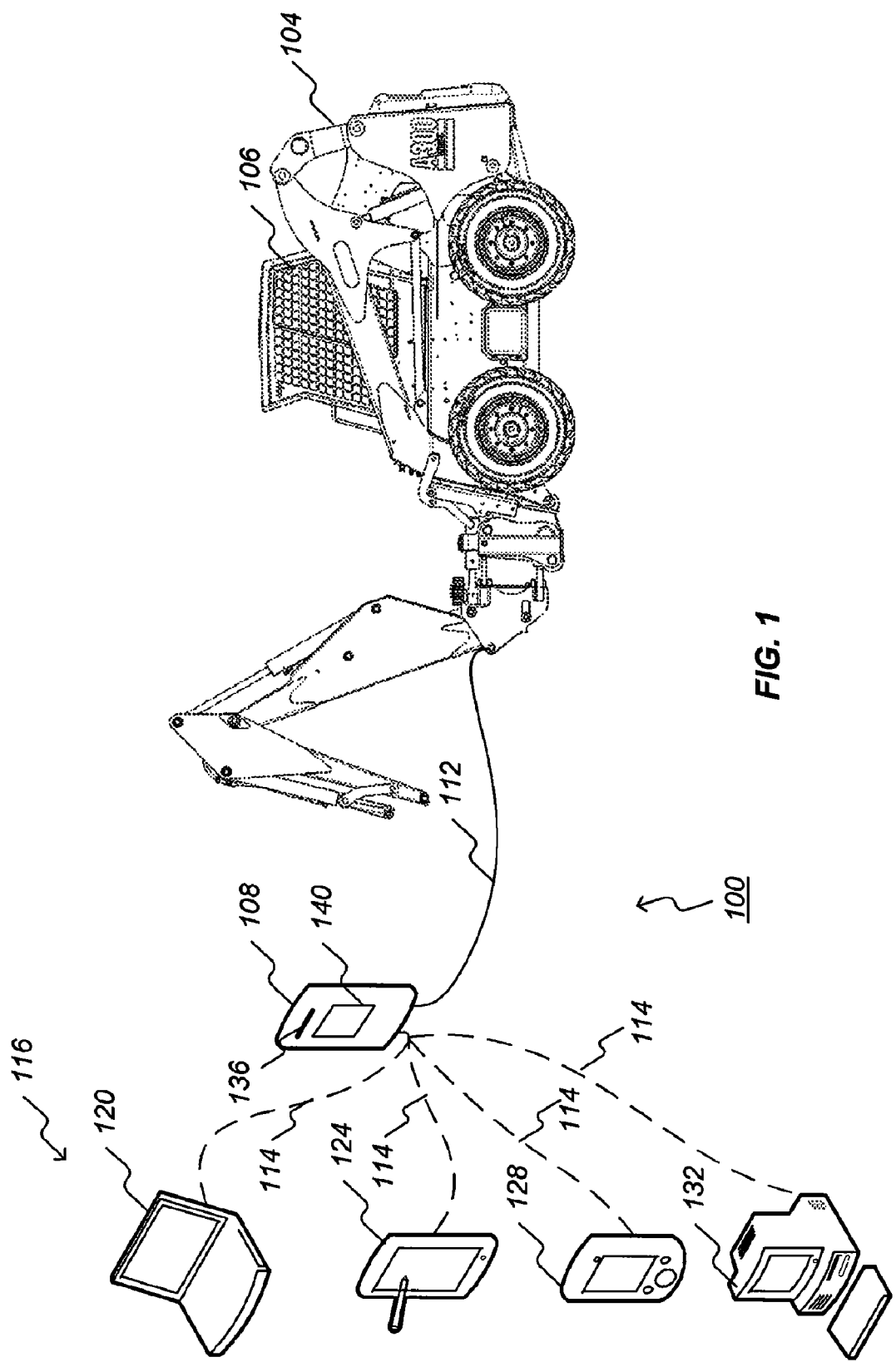
FIG. 1 is a representation of a power machine coupled an exemplary power machine diagnostic system.

FIG. 1 is an illustration of an exemplary power machine diagnostic system 100 coupled to a power machine 104. In the embodiment shown, the machine 104 is a skid steer loader having a cab 106. Although the machine 104 is shown as a skid steer loader, the machine 104 can also include a compact excavator, soil compactor, screed, air compressor, road development machines, other off-highway machine, and the like. The system 100 also includes a portable diagnostic tool 108 removably connected to the machine 104 with a first cable 112. The portable diagnostic tool 108 is also removably connected to via a second cable 114, one or more computers. The computers are generically referred to as external computing devices 116 such as a laptop computer 120, a tablet computer 124, a handheld device 128 such as a personal-digital-assistant or Blackberry device, and a personal computer 132. It should be noted that the first cable 112 is generically labeled, and that the first cable 112 for connecting the tool 108 to one machine 104 may be different from or the same as the first cable 112 for connecting the tool 108 to another machine 104. Similarly, it should be noted that the second cable 114 is generically labeled, and that the second cable 114 for connecting the tool 108 to one of the external computing devices 116 may be different from or the same as the second cable 114 for connecting the tool 108 to another one of the external computing devices 116.

In the embodiment shown, the tool 108 includes a removable computer-readable medium opening 136 for receiving a removable computer-readable medium to record data, such as how the machine 104 operates. In some cases, a protective plate (not shown) covers the opening 136 to protect the removable computer-readable medium from its operating environment. Additionally, the tool 108 can also include a tool clip (not shown) to allow a technician or an operator to clip the tool 108 onto the machine 104 such as at the cab 106.

Figure 2:
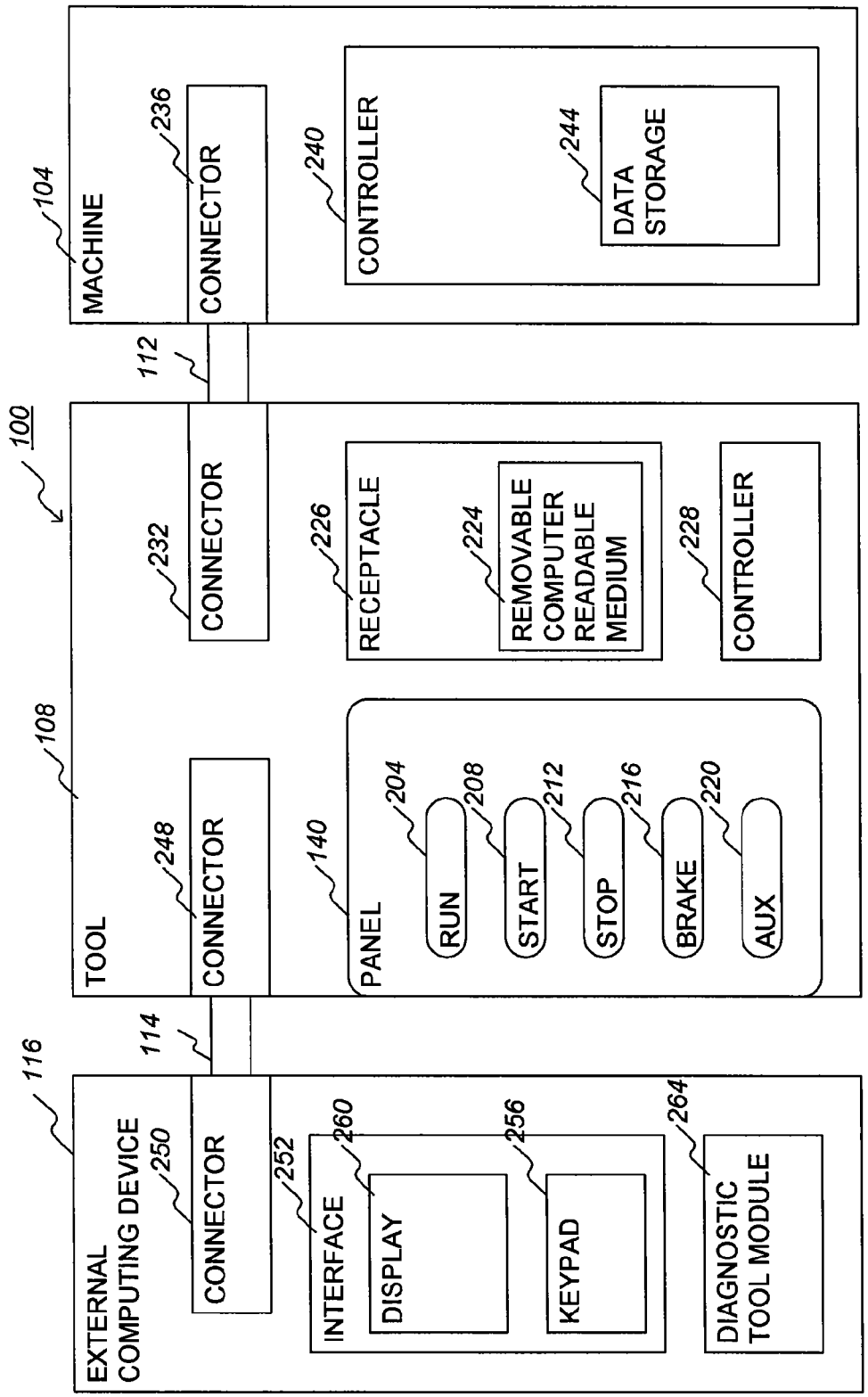
FIG. 2 is a block diagram illustrating the exemplary system of FIG. 1.

In the embodiment shown, the tool 108 also includes a panel 140. In some cases, the panel 140 is buttonless. In other cases, as shown in FIG. 2, the panel 140 includes a plurality of tool operating buttons. Particularly, FIG. 2 shows a block diagram illustrating the exemplary power machine system 100 of FIG. 1, wherein like numerals refer to like parts. When the panel 140 includes buttons, the buttons typically include a run button 204, a start button 208, a stop button 212, a brake button 216, and an auxiliary function ("aux") button 220.

Particularly, the tool 108 can be used as remote start tool unit. For example, when a technician pushes or depresses the run button 204, the tool 108 activates the machine 104 that the tool 108 is connected to. When the technician pushes or depresses the start button 208, the tool 108 activates or cranks an engine of the machine 104, starting the engine of the machine. Conversely, when the technician pushes or depresses the stop button 212, the tool 108 turns off the machine 104 and the tool 108. When the technician pushes or depresses the brake button 216, the tool 108 configures to disengage a brake of the machine 104. When the technician pushes or depresses the aux button 220, the tool 108 enables a plurality of auxiliary functions of the machine 104. For example, when the cab 106 is in the air during an operation, the tool 108 can still run some auxiliary functions due to its portability.

In the embodiment shown, the tool 108 includes a removable computer-readable medium 224 in a receptacle 226 to record data onto the removable computer-readable medium 224. Exemplary removable computer-readable media 224 include SD cards, memory sticks, flash drives, and the like. With the removable computer-readable medium 224, the tool 108 can capture data and log the data indicative of operating parameters of the machine 104. Specifically, incorporating the removable computer-readable medium 224 with the tool 108 allows a technician to use the external computing device 116 to set the tool 108 to log data. For example, the technician can set the tool 108 to capture a pressure, a wheel position, joystick position, a group of different values, and the like. After setting the tool 108 to capture selected data, the technician can choose to unhook or disconnect the tool 108 from the external computing device 116, and position the tool 108 on the machine 104. In this way, the tool 108 will capture data for a period of time. The technician can subsequently come back and remove the removable computer-readable medium 224 from the tool, and perform analysis on the data, detailed hereinafter.

The tool 108 also includes a controller 228 that allows communication between the machine 104 and the external computing device 116. For example, with the external computing device 116 connected to the tool 108, a technician can use the tool 108 and its controller 228 to convert information from the machine 104 into a format acceptable by the external computing device 116. Similarly, when the external computing device 116 sends a signal to the machine 104 requesting information from the machine 104, the tool 108 and its controller 228 convert the request signals (for example, serial signals) into a format acceptable by the machine 104. Exemplary format include control-area-network ("CAN") bus protocols. In such cases, the controller 228 converts the serial request signals into CAN bus signals readable by the machine 104. In some cases, the machine 104 may include other communication protocols such as RS485 protocol. The controller 228, through a regular RS485 cable as the first cable 112, converts data from the external computing device 116 into data formatted to comply with RS485 communication protocols. In this way, a technician is allowed to retrieve machine information such as error codes, machine identifying information, and operating parameters such as pressure and temperatures.

As described earlier, the tool 108 can be connected to the machine 104 with the first cable 112. The first cable 112 is connected to the tool 108 at a tool interface connector 232 on one end, and is connected to the machine 104 at a machine connector 236 on another end. Depending on the machine 104 that the tool 108 is connected to, the first cable 112 can be different. Exemplary first cables 112 include a RS232 cable, RS485 cable, J1939 cable, USB cable, and the like. Exemplary connectors 236 include a DB9 connector, DB15 connector, USB port, J1939-11 connector, and the like. In this way, when the machine 104 is set to communicate with the tool 108 or the external computing device 116, via the connectors 232, 236 and the cable 112, a machine controller 240 can transmit information stored in a data storage 244 to the tool 108 and the external computing device 116. In the embodiment shown, the data storage 244 is internal to the controller 240. However, the data storage 244 can also be external to the controller 240. Moreover, the information being communicated to the tool 108 and the external computing device 116 can also originate from sensors (not shown) positioned in the machine 104 and is collected by the controller 240.

Similarly, the second cable 114 connects the tool 108 to the external computing device 116. In the embodiment shown, the second cable 114 is connected to the tool 108 at a second interface connector 248, and the second cable 114 is connected to the external computing device 116 at a device connector 250. In some embodiments, the second cable 114 is a RS232 cable, and thus the connectors 248, 252 are RS232 connectors. Other types of cables and corresponding connectors can also be used. In other embodiments, the tool 108 can communicate with the external computing device 116 and the machine 104 wirelessly using wireless communication protocols such as personal-area-network protocols including, but not limited to, Bluetooth.

The external computing device 116 as shown in FIG. 2 includes a human-machine interface ("HMI") 252. In some embodiments, the HMI 252 includes a keypad 256 and a display 260. The HMI 252 allows a technician or an operator to interact with the external computing device 116, the tool 108, and the machine 104. In the embodiment shown, communication between the external computing device 116 and the machine 104 is controlled or monitored by a diagnostic tool module 264, which can be implemented as software, firmware, or a combination software and firmware.

Figure 3:
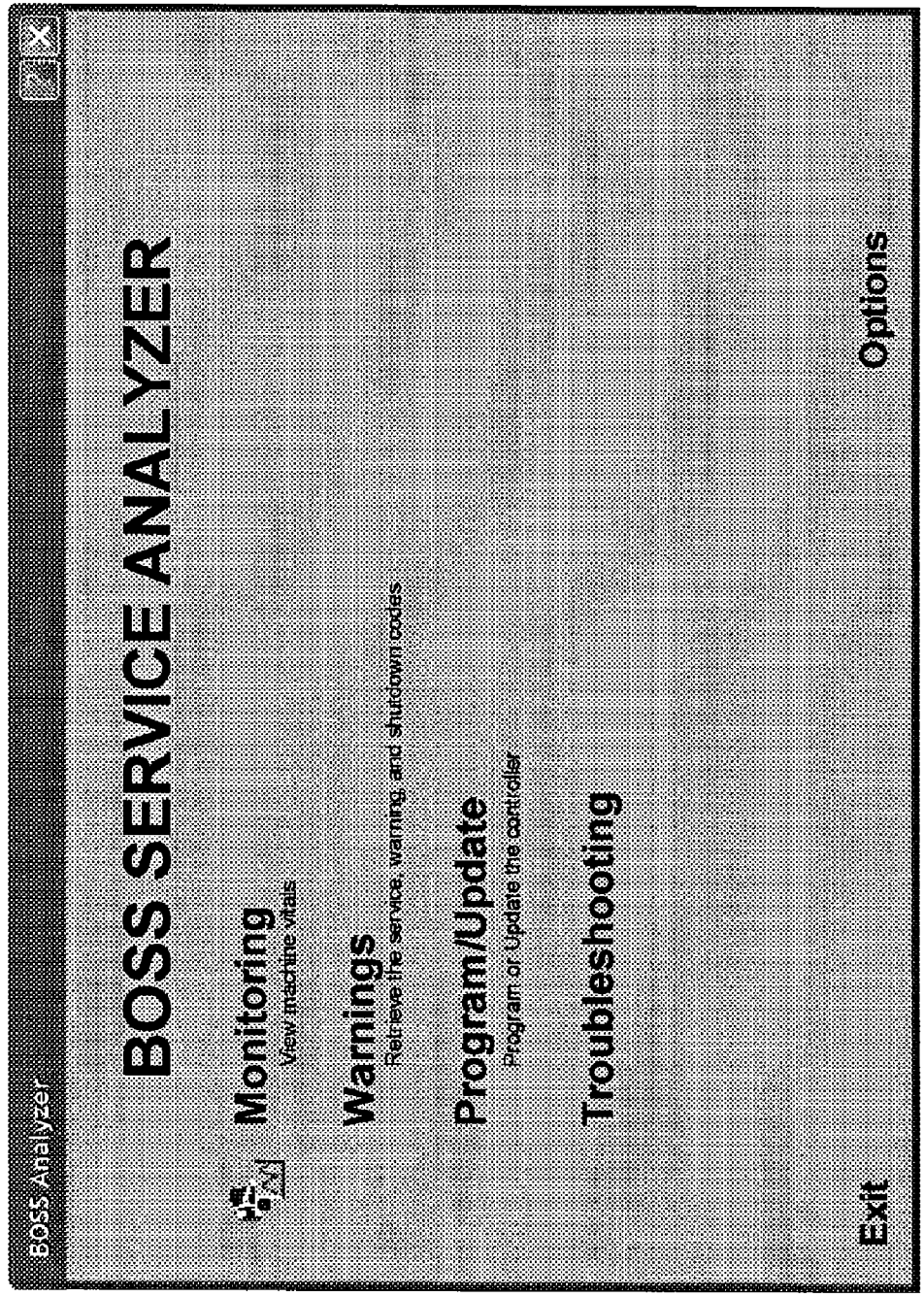
FIG. 3 is an exemplary screen illustrating analyzing functions.
Figure 4:
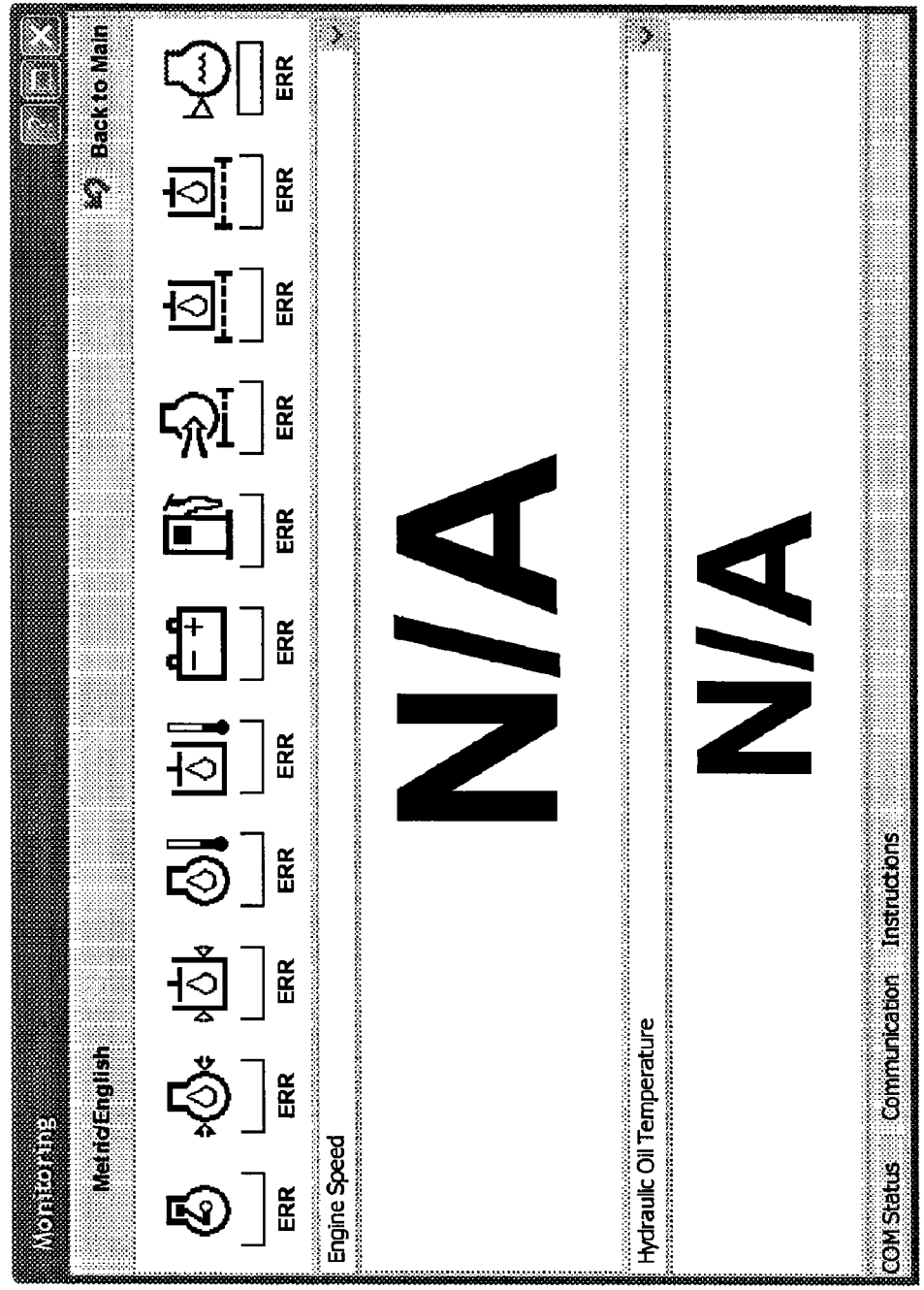
FIG. 4 is an exemplary screen illustrating monitoring functions.

In some embodiments, the module 264 can communicate through the tool 108 with a machine 104 from a third party, or a machine 104 that uses older communication protocol. FIG. 3 is an exemplary screen 300 illustrating analyzing functions available on a machine 104 that uses older communication protocol. In the embodiment shown, the module 264 replaces functions that are previously available in other handheld device, and displays the functions in a PC format. The technician can use the module 264 to easily manipulate and monitor different data of machines that use older communication protocol. A technician thus can select monitoring the machine 104, programming or updating the controller 240 of the machine 104, troubleshooting the machine 104, and retrieving warning codes generated by the machine 104. FIG. 4 is an exemplary screen 400 illustrating monitoring functions.

Figure 5:
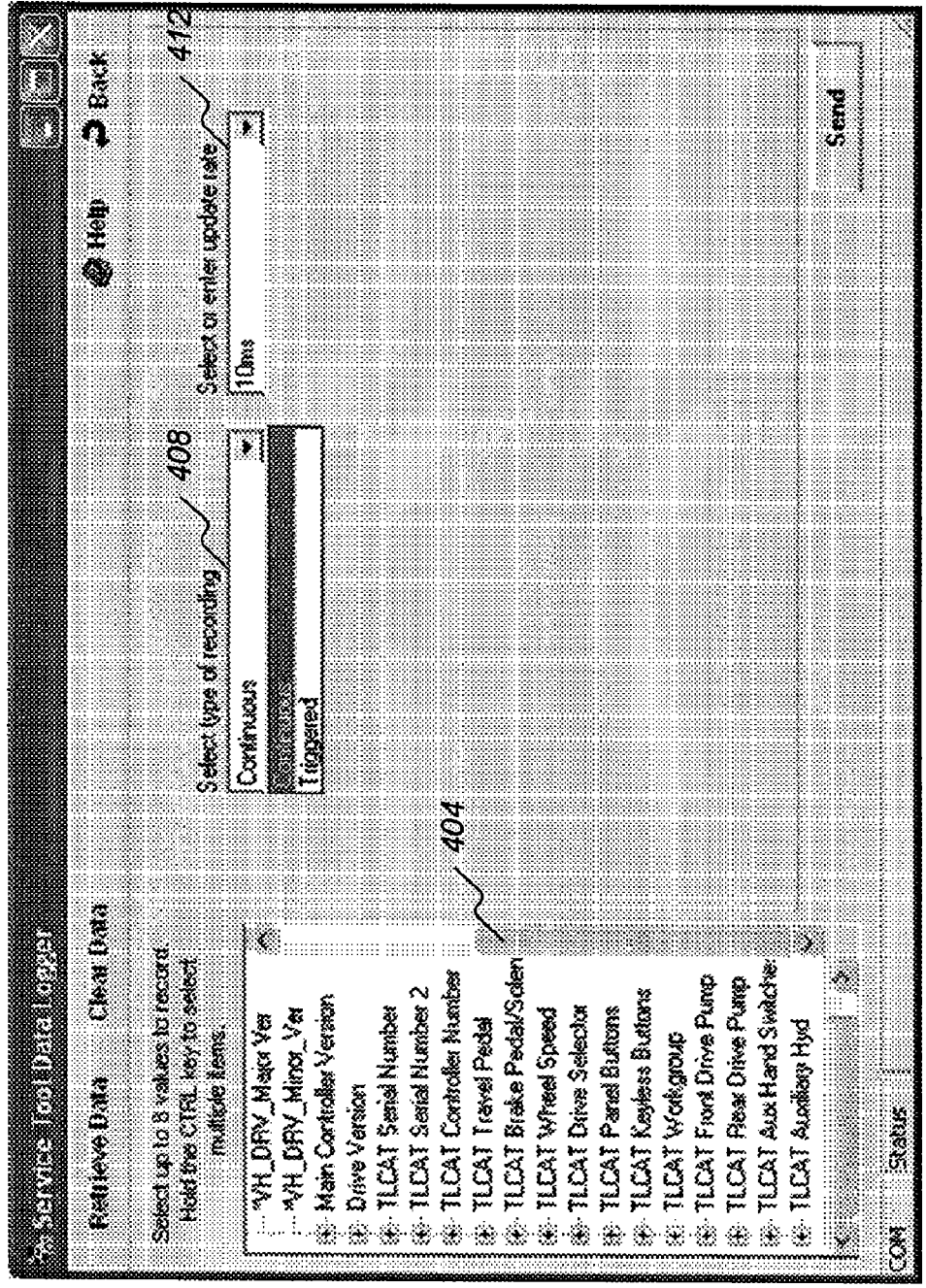
FIG. 5 is an exemplary screen illustrating logging functions and recording function selections.

Additionally, the module 264 also allows the tool 108 to capture and log data relating to operating parameters of the machine 104. FIG. 5 is an exemplary screen illustrating logging function and recording function selections. In the embodiment shown, a technician can select up to eight different operating parameters to be logged from a scroll screen 404. Similarly, a technician can also select a type of recording from a drop-down menu 408. Two types of recording are available as shown. These types are continuous recording that allows the tool 108 to continuously record data as it appears, and triggered recording that allows the tool 108 to record when a predetermined condition is triggered. A technician can also select an update rate with another drop-down menu 412 to set how frequent data is updated. In some embodiments, a technician can enter through the HMI 252 a specific update rate, instead of selecting from a plurality of preset values.

Figure 6:
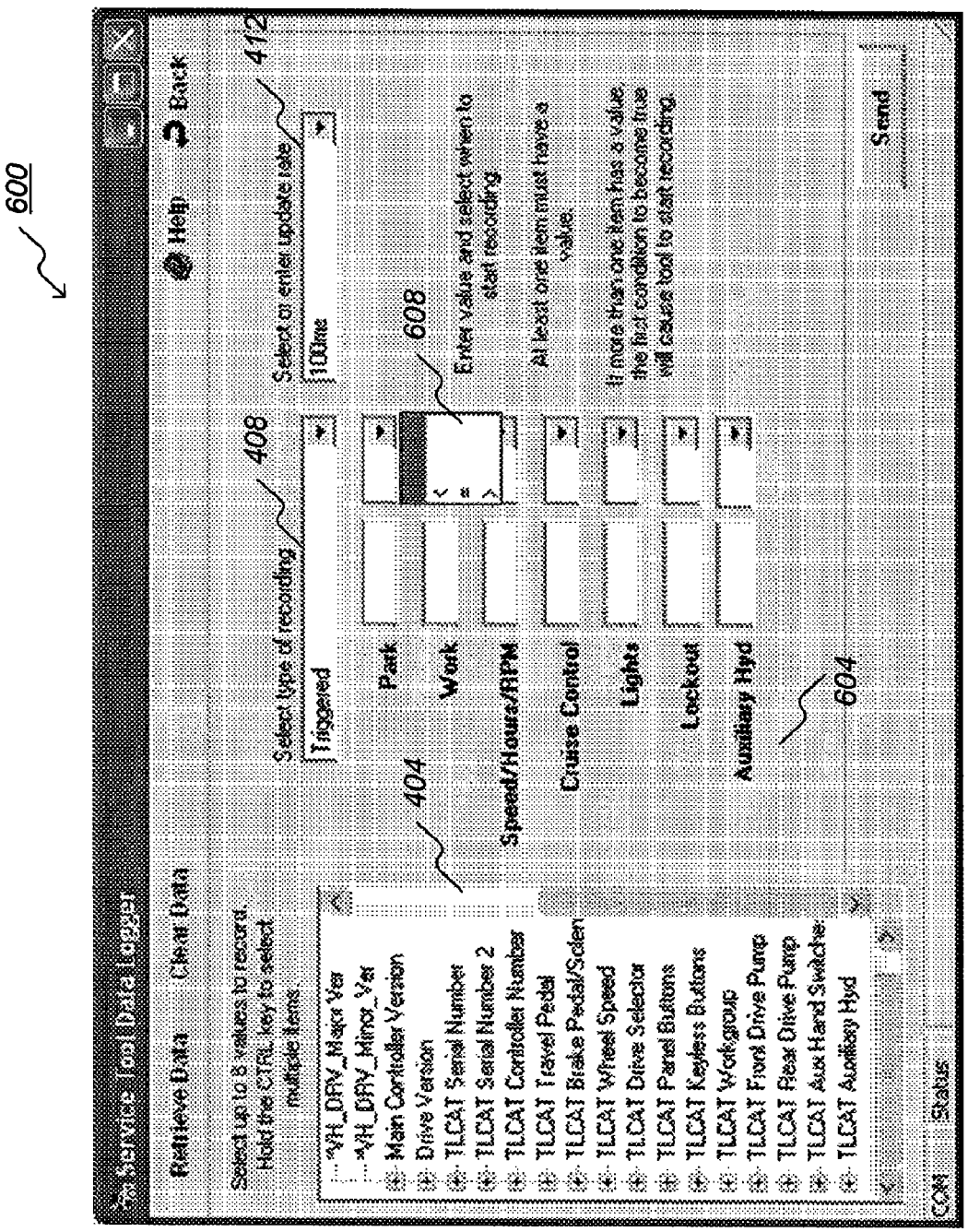
FIG. 6 is an exemplary screen illustrating operating parameter and triggering condition selections.
Figure 7:
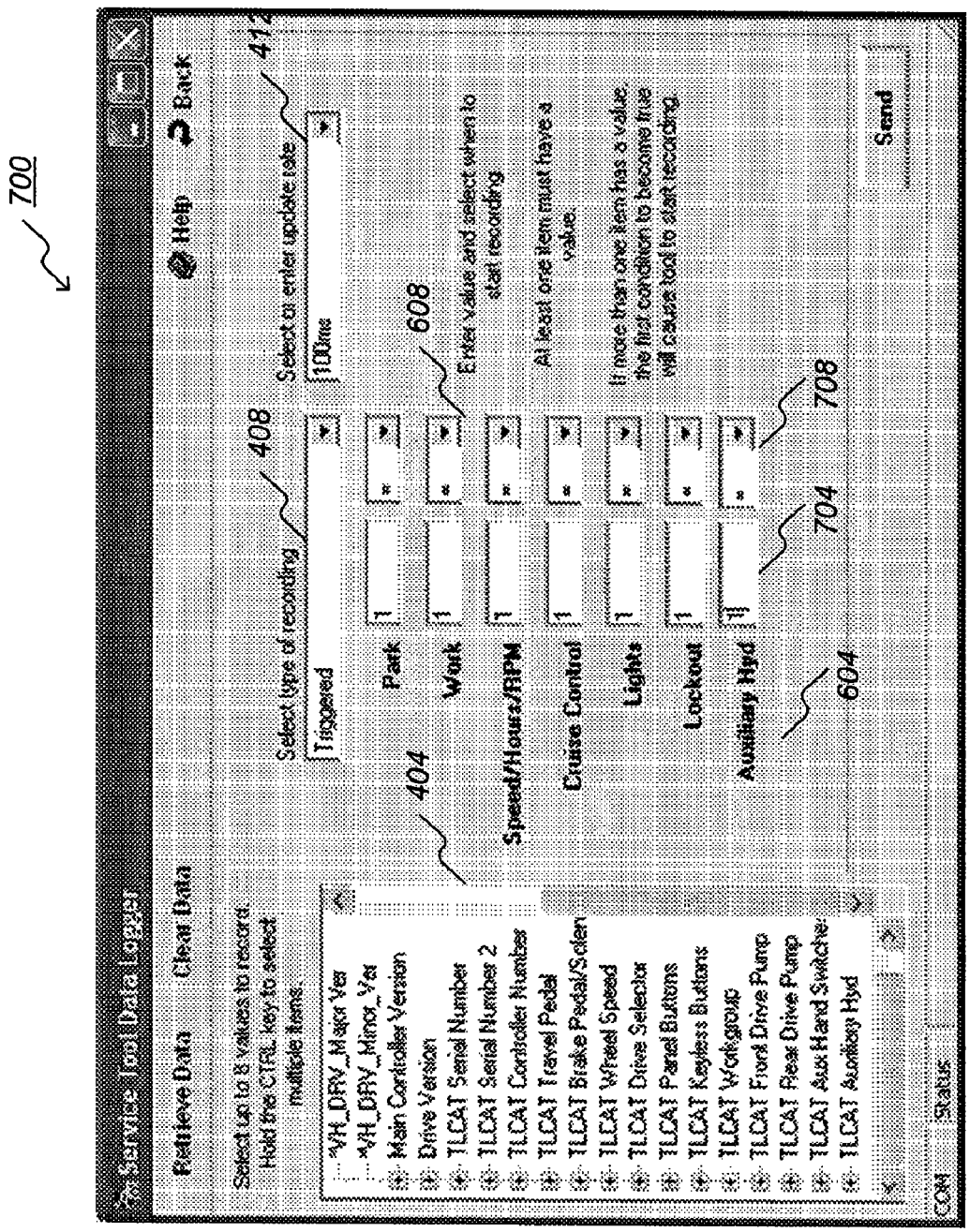
FIG. 7 is an exemplary screen illustrating value selections menus.

FIG. 6 is an exemplary screen 600 illustrating triggered recording selections. As shown, a triggered type of recording has been selected in the drop-down menu 408, and an update rate of 100 ms has been selected in the drop-down menu 412. Additionally, eight different operating parameters 604 have been selected. Three triggering conditions are shown in a drop-down menu 608. The three triggering conditions are "greater than," "equal to," and "less than." FIG. 7 is an exemplary screen 700 illustrating value selections in the triggered recording screen 600. Triggered values for each of the eight selected operating parameters are exemplarily selected to be 1 with corresponding triggering conditions as "equal to." That is, for example, when a "park" value equals to 1, the tool 108 records a plurality of operating parameters from the machine 104.

Figure 8:
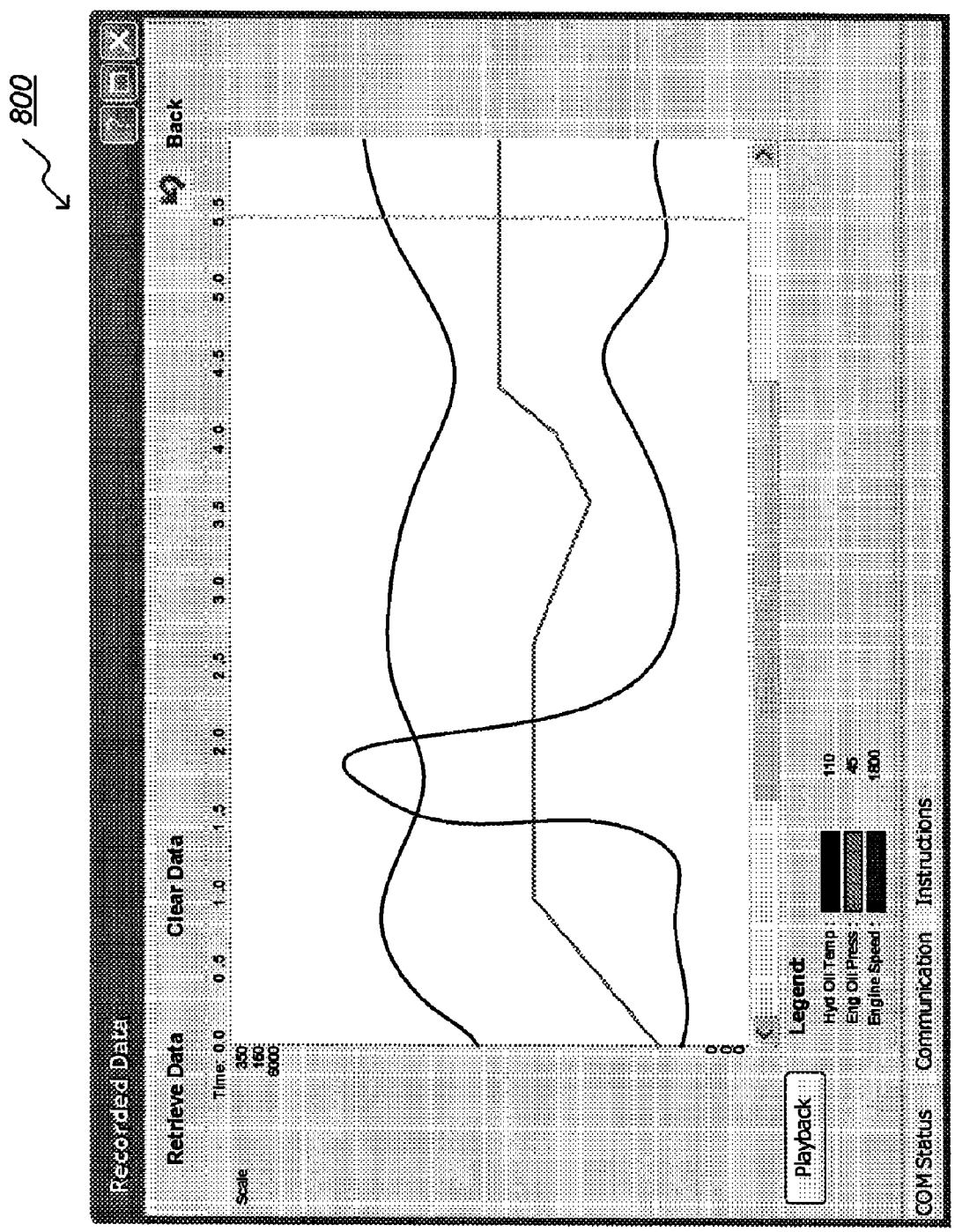
FIG. 8 is an exemplary screen illustrating playback functions.

After data has been logged by the tool 108, a technician can retrieve and display the logged data with the HMI 252 using the module 264 if the tool 108 and the computer-readable medium 224 remain connected. In other cases, a technician can remove the computer-readable medium 224 from the tool 108, and analyze and display the logged data in the computer-readable medium 224 at a later time, or with other external computing devices. FIG. 8 is an exemplary screen 800 illustrating playback functions. In the embodiment shown, three operating parameter including hydraulic oil temperatures, engine oil pressure, and engine speed have been captured over a period of time using triggered recording.

Various features and advantages of the invention are set forth in the following claims.

What is claimed is:

1. A power machine diagnostic system and power machine assembly, the assembly comprising:
    a power machine including:
        a machine connector,
        a data storage configured to store machine information, and
        a machine controller coupled to the machine connector and the data storage, and
            configured to transmit the machine information from the data storage, and
            to receive data through the connector;
    a portable diagnostic tool configured to be coupled to the power machine, the tool including:
        a first connector configured to be removably coupled to the machine connector,
        a processor configured to receive at least a first portion of the machine information through the first connector, and to send at least a second portion of the machine information,
        a second connector configured to relay the at least a second portion of the machine information, and to receive data to be processed by the processor, and
        a removable computer-readable medium receptacle configured to record at least a third portion of the machine information;
    an external computing device configured to be removably coupled to the second connector, to receive the at least a second portion of the machine information, to identify a type of machine coupled to the first interface based on the received machine information, and to instruct the processor to record at least a fourth portion of the machine information.

2. The system of claim 1, wherein the tool further comprises a plurality of buttons configured to remote control the machine.

3. The system of claim 1, wherein the power machine comprises one of a skid steer loader, excavator, compactor, screed, air compressor, and road development machine.

4. The system of claim 1, wherein the receptacle comprises an opening configured to receive a removable computer-readable medium.

5. The system of claim 1, wherein the external computing device further comprises a software module configured to analyze the recorded machine information.

6. The system of claim 1, wherein the external computing device further comprises a software module configured to display the recorded machine information.

7. The system of claim 1, wherein the processor is further configured to receive data from the machine in a first format, and to convert the data into a second format readable by the external computing device.

8. The system of claim 1, wherein the processor is further configured to receive data from the external computing device in a first format, and to convert the data into a second format readable by the machine.

9. A method of diagnosing various, distinct power machines with a portable diagnostic tool, the power machine having an machine interface configured to communicate with a controller of the machine, the method comprising:
   removably coupling a first interface of the tool to the machine interface of the power machine;
   communicating data from the controller of the machine to the first interface of the tool through the machine interface;
   receiving the data at a processing module of the tool through the first interface of the tool;
   relaying at least a portion of the data from the processing module, through a second interface of the tool, to an external computing device coupled to the second connector;
   identifying at the external computing device a type of machine coupled to the first interface of the tool based on the data received at the external computing device from the processing module;
   receiving at the processing module of the tool, from the external computing device and through the second interface, a plurality of control instructions based on the identified machine;
   communicating at least a portion of the control instructions from the processing module of the tool to the controller of the power machine through the respective first interface and machine interface; and
   recording at the tool data indicative of the machine in response to the control instructions from the external computing device.

10. The method of claim 9, further comprising:
   providing a plurality of control buttons on the tool; and
   remote controlling the machine with the buttons.

11. The method of claim 9, wherein the power machine comprises one of a skid steer loader, excavator, compactor, screed, air compressor, and road development machine.

12. The method of claim 9, wherein recording data further comprises recording the data with a removable computer-readable medium.

13. The method of claim 9, further comprising analyzing and displaying the recorded data.

14. The method of claim 9, wherein receiving from at the processing module of the tool, from the external computing device and through the second interface the plurality of control instructions further comprises receiving from the external computing device a plurality of control instructions in a first data format.

15. The method of claim 14, further comprising converting the control instructions in the first data format into a second data format at the tool.

16. The method of claim 9, wherein communicating data from the controller of the machine further comprises receiving the data from the controller in a first data format.

17. The method of claim 16, further comprising converting the data in the first data format into a second format at the tool to be readable by the external computing device.

18. A portable diagnostic tool configured to be removably connected to a power machine having a machine controller configured to store machine information, and further having a machine connector, and the tool further configured to be removably connected to a computer, the tool comprising:
   a first interface connector configured to be removably connected to the machine connector;
   a tool controller configured to communicate with the machine controller through the first interface connector, to retrieve the machine information, and to communicate the machine information to the computer;
   a second interface connector configured to be removably connected to the computer, to relay data including the machine information to the computer, and to receive instructions including data relating to the machine information from the computer to the tool controller and the machine controller, the instructions from the computer including an identification of a type of machine coupled to the first interface connector determined based on the relayed data including machine information, the instructions from the computer also including a first portion of the instructions which instruct the tool controller to record at least a portion of the machine information; and
   a removable computer-readable medium receptacle configured to record operating parameters of the machine in response to the instructions from the computer.

19. The tool of claim 18, further comprising a plurality of buttons configured to remote control the machine.

20. The tool of claim 18, wherein the power machine comprises one of a skid steer loader, excavator, compactor, screed, air compressor, and a road development machine.

21. The tool of claim 18, further the removable computer-readable medium receptacle comprising an opening configured to receive a removable computer-readable medium.

22. The tool of claim 18, wherein the computer further comprises a software module configured to analyze and display the recorded operating parameters.

23. The tool of claim 18, wherein the tool controller is further configured to receive data from the machine in a first format, and to convert the data into a second format readable by the computer.

24. The tool of claim 18, wherein the tool controller is further configured to receive data from the computer in a first format, and to convert the data into a second format readable by the machine.

* * * * *